United States Patent
Wu

(10) Patent No.: US 10,681,597 B2
(45) Date of Patent: *Jun. 9, 2020

(54) DEVICE AND METHOD FOR HANDLING A PACKET FLOW IN INTER-SYSTEM MOBILITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 91 days.

This patent is subject to a terminal disclaimer.

(21) Appl. No.: 15/861,622

(22) Filed: Jan. 3, 2018

(65) Prior Publication Data
US 2018/0192334 A1  Jul. 5, 2018

Related U.S. Application Data

(60) Provisional application No. 62/442,929, filed on Jan. 5, 2017.

(51) Int. Cl.
*H04W 36/00* (2009.01)
*H04W 36/14* (2009.01)
(Continued)

(52) U.S. Cl.
CPC ... *H04W 36/0044* (2013.01); *H04W 36/0033* (2013.01); *H04W 36/14* (2013.01);
(Continued)

(58) Field of Classification Search
CPC ............. H04W 36/0033; H04W 36/14; H04W 36/0044
See application file for complete search history.

(56) References Cited

U.S. PATENT DOCUMENTS 10,299,173 B2 *  5/2019  Wu .................. H04W 36/0011
2013/0070596 A1  3/2013  Yeh
(Continued)

FOREIGN PATENT DOCUMENTS

| CN | 102892157 A | 1/2013 |
|----|-------------|--------|
| CN | 104244219 A | 12/2014 |
| EP | 2052564 B1  | 10/2014 |

OTHER PUBLICATIONS

3GPP TR 23.799 V14.0.0 (Dec. 2016) Technical Report, 3rd Generation Partnership Project; Technical Specification Group Services and System Aspects; Study on Architecture for Next Generation System (Release 14).

(Continued)

*Primary Examiner* — Gbemileke J Onamuti
(74) *Attorney, Agent, or Firm* — Winston Hsu

(57) ABSTRACT

A LTE network for handling mobility for a communication device from the LTE network to a NR network comprises a storage device for storing instructions and a processing circuit coupled to the storage device. The processing circuit is configured to execute the instructions stored in the storage device. The instructions comprise connecting to the communication device; communicating an evolved packet system (EPS) bearer identity (ID) identifying an EPS bearer with the communication device; communicating data via the EPS bearer with the communication device; receiving a context request message for the communication device from the NR network; and transmitting a context response message comprising a context of the communication device to the NR network.

15 Claims, 8 Drawing Sheets

(51) Int. Cl.
  *H04W 84/04* (2009.01)
  *H04W 88/06* (2009.01)
(52) U.S. Cl.
  CPC ...... *H04W 36/0066* (2013.01); *H04W 84/042* (2013.01); *H04W 88/06* (2013.01)

(56) References Cited

U.S. PATENT DOCUMENTS

2018/0288233 A1* 10/2018 Tamura .................. H04W 76/15
2019/0058997 A1*  2/2019 Futaki ................... H04W 76/27

OTHER PUBLICATIONS

Search Report dated Jun. 6, 2018 for EP application No. 18150463.0, pp. 1-7.
Nokia, KDDI, Qualcomm Incorporated, Huawei, "Updates on interworking and migration solution 18.2: Call flows", SA WG2 Meeting #117, S2-166101, Oct. 17-21, 2016, Kaohsiung, Taiwan, XP051170061, pp. 1-7.
Huawei, "User plane design details for LTE-NR tight interworking", 3GPP TSG-RAN WG3 Meeting #94, R3-162926, Nov. 14-18, 2016, Reno, Nevada, USA, XP051179026, pp. 1-2.
Huawei, "Functionality and procedure for LTE-NR tight interworking" 3GPP TSG-RAN WG3 Meeting #93, R3-161757, Aug. 22-26, 2016, Gothenburg, Sweden, XP051127590, pp. 1-3.
Huawei, HiSilicon, "Discussion on LTE-NR handover", 3GPP TSG-RAN WG2 Meeting #96, R2-168570, Nov. 14-18, 2016, Reno, Nevada, USA, XP051193101, pp. 1-3.
Office action dated Oct. 2, 2018 for the Taiwan application No. 107100332, filing date Jan. 4, 2018, pp. 1-9.
Ericsson: "UE context handling during inter RAT handover", 3GPP TSG-RAN WG2 #96; R2-168302; Reno, Nevada, USA, Nov. 14-18, 2016.
Office action dated Dec. 27, 2019 for the China application No. 201810011513.0, filing date Jan. 5, 2018, p. 1-11.

* cited by examiner

DEVICE AND METHOD FOR HANDLING A PACKET FLOW IN INTER-SYSTEM MOBILITY

CROSS REFERENCE TO RELATED APPLICATIONS

This application claims the benefit of U.S. Provisional Applications No. 62/442,929 filed on Jan. 5, 2017, which is incorporated herein by reference.

BACKGROUND OF THE INVENTION

1. Field of the Invention

The present invention relates to a device and a method used in a wireless communication system, and more particularly, to a device and a method of handling a packet flow in inter-system mobility in a wireless communication system.

2. Description of the Prior Art

The Third Generation Partnership Project (3GPP) recently starts developing a next generation cellular system called a new radio (NR) system or a next generation (NextGen) system. To provide seamless service continuity for a UE moving between a long-term evolution (LTE) system and the NR system, inter-system mobility between the two systems is an issue to be solved.

SUMMARY OF THE INVENTION

The present invention therefore provides a communication device for handling a packet flow in inter-system mobility to solve the abovementioned problem.

A LTE network for handling mobility for a communication device from the LTE network to a NR network comprises a storage device for storing instructions and a processing circuit coupled to the storage device. The processing circuit is configured to execute the instructions stored in the storage device. The instructions comprise connecting to the communication device; communicating an evolved packet system (EPS) bearer identity (ID) identifying an EPS bearer with the communication device; communicating data via the EPS bearer with the communication device; receiving a context request message for the communication device from the NR network; and transmitting a context response message comprising a context of the communication device to the NR network.

A LTE network for handling mobility for a communication device from the LTE network to a NR network comprises a storage device for storing instructions and a processing circuit coupled to the storage device. The processing circuit is configured to execute the instructions stored in the storage device. The instructions comprise connecting to the communication device; communicating an EPS bearer ID identifying an EPS bearer with the communication device; communicating data via the EPS bearer with the communication device; transmitting a request message comprising a context of the communication device to the NR network for initiating a handover for the communication device to the NR network; receiving a response message from the NR network, wherein the response message comprises a handover command message for handing over the communication device to the NR network; and transmitting the handover command message to the communication device.

A communication device for handling mobility for the communication device from the LTE network to a NR network comprises a storage device for storing instructions and a processing circuit coupled to the storage device. The processing circuit is configured to execute the instructions stored in the storage device. The instructions comprise connecting to the LTE network; communicating a first EPS bearer ID identifying a first EPS bearer with the LTE network; communicating first data via the first EPS bearer with the LTE network; receiving a handover command message from the LTE network; handing over to the NR network according to the handover command message; and transmitting second data on a first radio bearer (RB), when the handover command message configures the first RB associated to a first flow ID, wherein the first flow ID is associated to the EPS bearer identity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
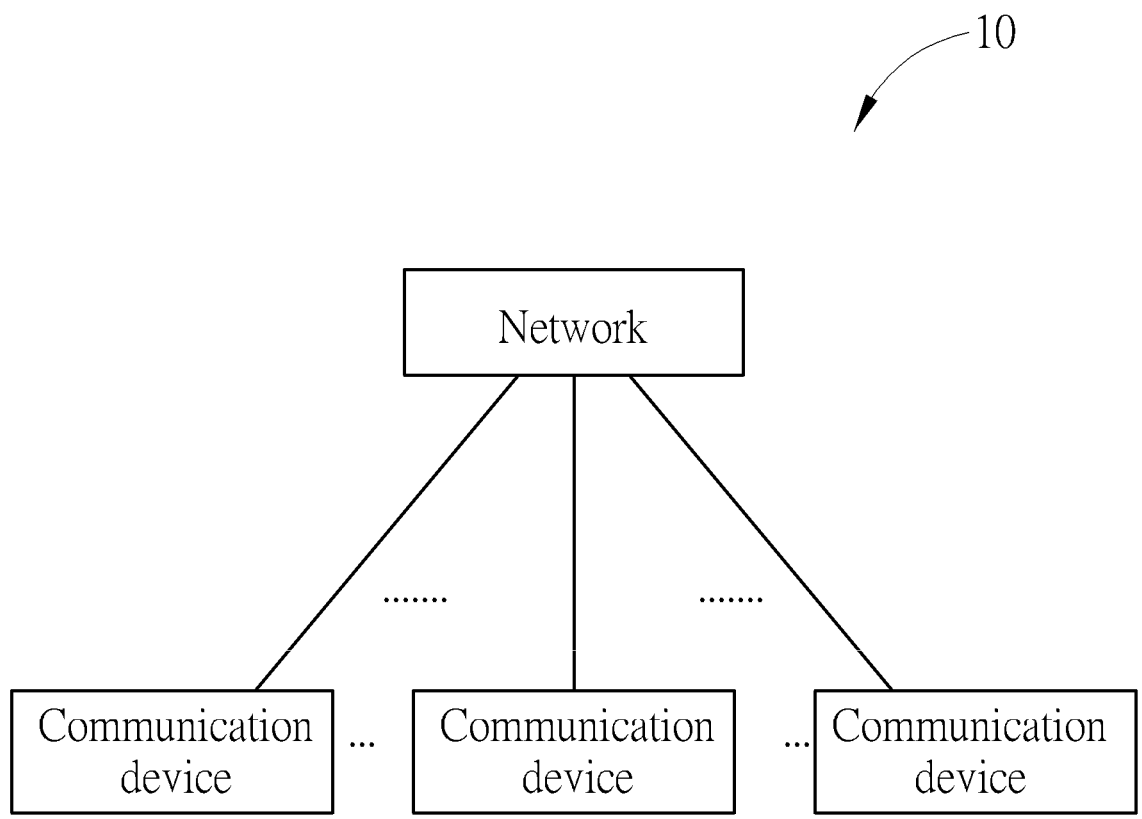
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers.

In FIG. 1, the network and the communication devices are simply utilized for illustrating the structure of the wireless communication system 10. The network may be an evolved universal terrestrial radio access network (E-UTRAN) including at least one evolved Node-B (eNB). The network may be a fifth generation (5G) network including at least one 5G BS which employs orthogonal frequency-division multiplexing (OFDM) and/or non-OFDM. In general, a BS may also be used to refer any of the eNB and the 5G BS.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
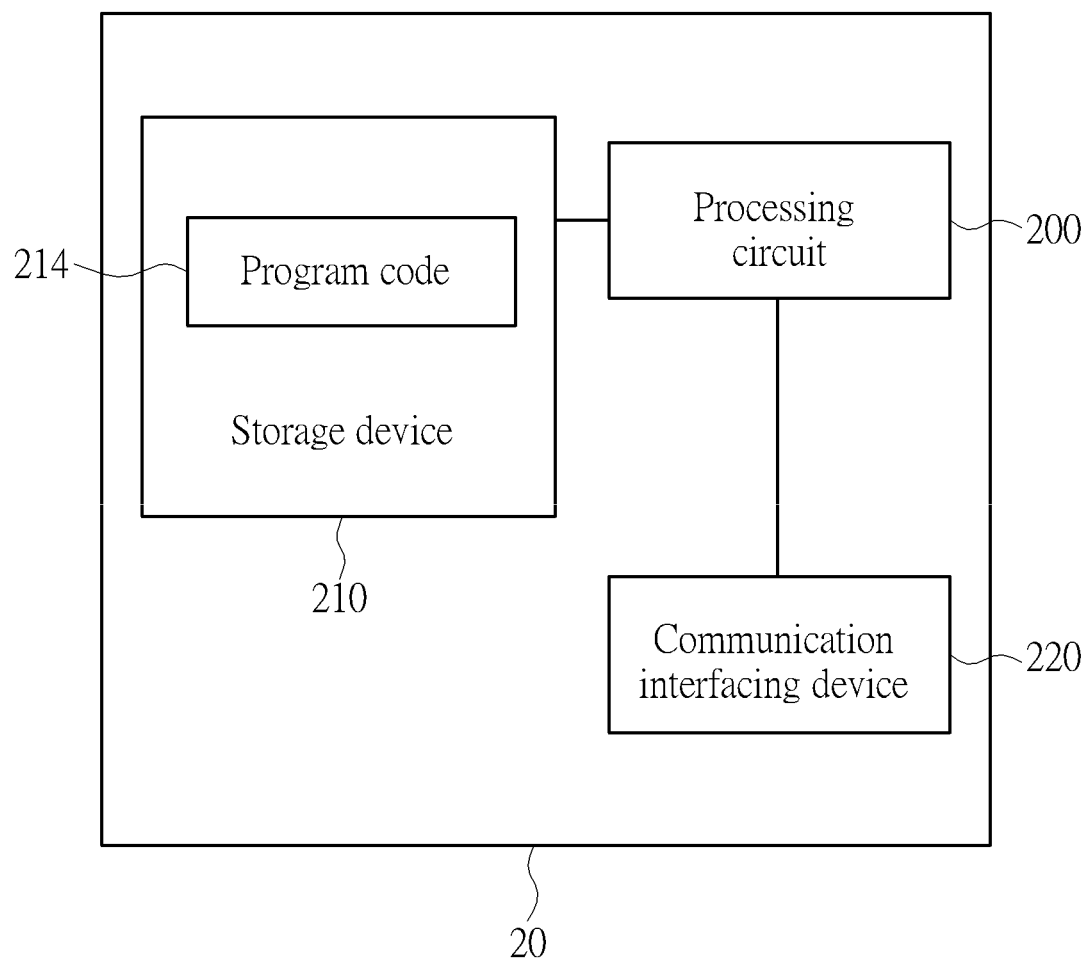
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit, a storage device 210 and a communication interfacing device 220. The storage device 210 may be any data storage device that may store a program code 214, accessed and executed by the processing circuit 200. Examples of the storage device 210 include but are not limited to a subscriber identity module, read-only memory, flash memory, random-access memory, hard disk, optical data storage device, non-volatile storage device, non-transitory computer-readable medium (e.g., tangible media), etc. The communication interfacing device 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
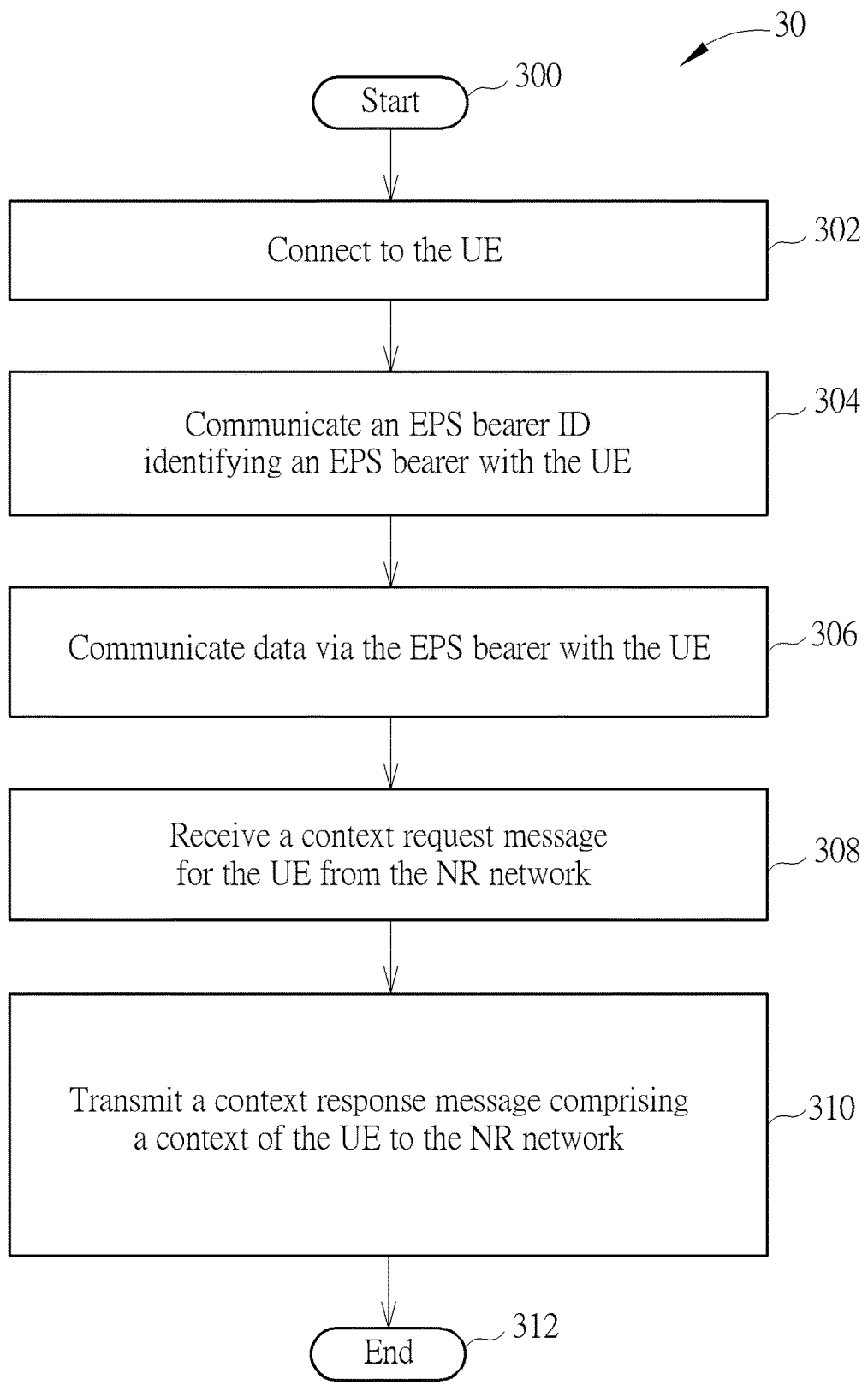
FIG. 3 is a flowchart of a process according to an example of the present invention.

FIG. 3 is a flowchart of a process 30 according to an example of the present invention. The process 30 can be utilized in a long-term evolution (LTE) network (e.g., the network in FIG. 1), for handling mobility for a UE from the LTE network to a new radio (NR) network. The process 30 includes the following steps:

Step 300: Start.

Step 302: Connect to the UE.

Step 304: Communicate an evolved packet system (EPS) bearer identity (ID) identifying an EPS bearer with the UE.

Step 306: Communicate data via the EPS bearer with the UE.

Step 308: Receive a context request message for the UE from the NR network.

Step 310: Transmit a context response message comprising a context of the UE to the NR network.

Step 312: End.

The following examples may be applied to the process 30.

In one example, the NR network may transmit the context request message to the LTE network, when the NR network receives a mobility management (MM) request message (e.g., tracking area update request message or registration request message) from the UE. After the NR network receives the context response message, the NR network may transmit a MM response message (e.g., tracking area update accept message or registration accept message) to the UE. Thus, the NR network may configure radio resources for communicating data, to the UE according to the EPS bearer context, when the NR network receives a service request message from the UE. The UE and the NR network can communicate (e.g., transmit or receive) data via the radio resources.

Figure 4:
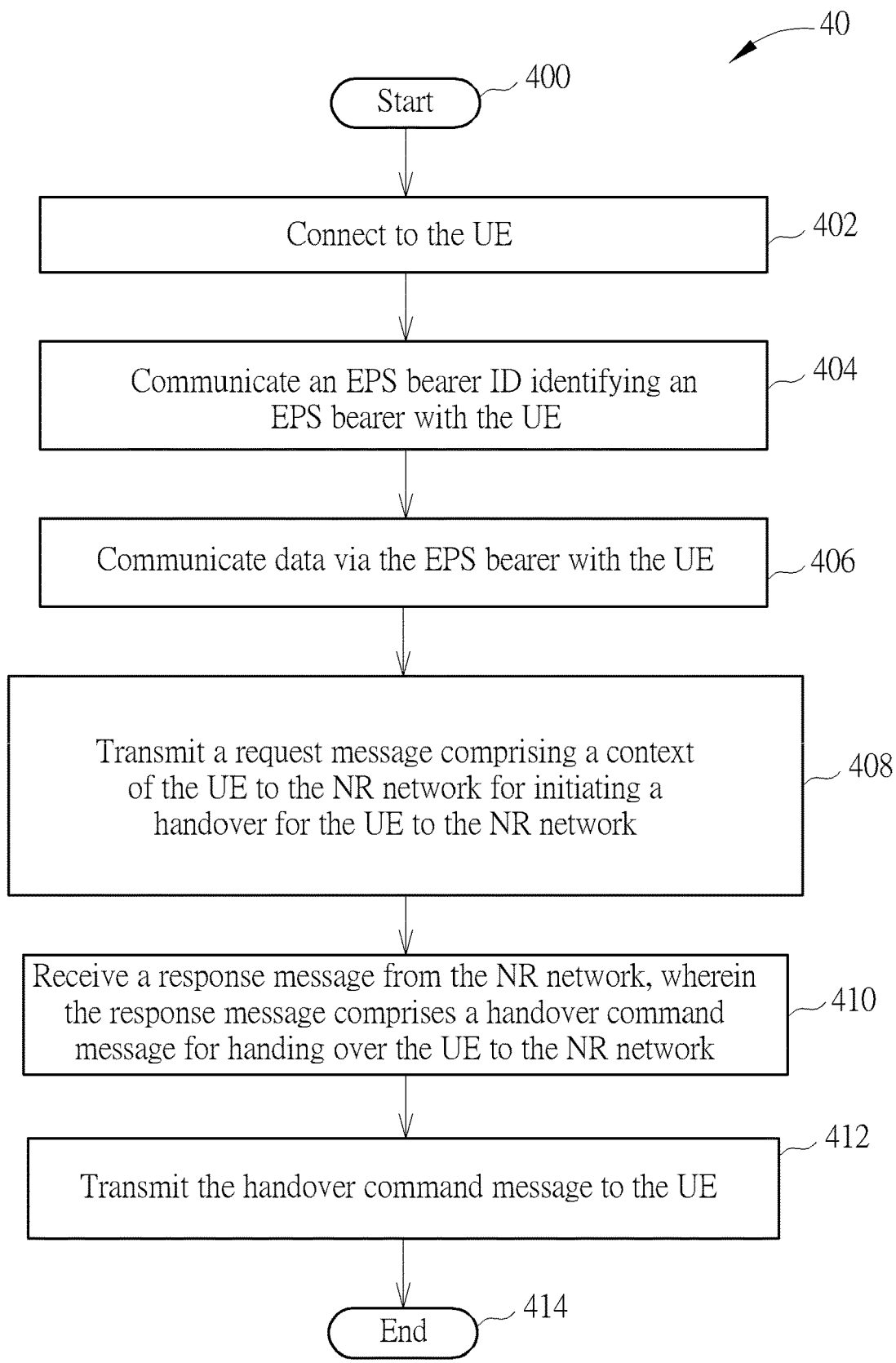
FIG. 4 is a flowchart of a process according to an example of the present invention.

FIG. 4 is a flowchart of a process 40 according to an example of the present invention. The process 40 can be utilized in a LTE network (e.g., the network in FIG. 1), for handling mobility for a UE from the LTE network to a NR network. The process 40 includes the following steps:

Step 400: Start.

Step 402: Connect to the UE.

Step 404: Communicate an EPS bearer ID identifying an EPS bearer with the UE.

Step 406: Communicate data via the EPS bearer with the UE.

Step 408: Transmit a request message comprising a context of the UE to the NR network for initiating a handover for the UE to the NR network.

Step 410: Receive a response message from the NR network, wherein the response message comprises a handover command message for handing over the UE to the NR network.

Step 412: Transmit the handover command message to the UE.

Step 414: End.

The following examples may be applied to the process 40.

In one example, the request message is a handover request message, and the response message is a handover request acknowledge message.

In one example, the LTE network generates (e.g., derives, converts to, or maps to) a first plurality of quality-of-service (QoS) parameters in the EPS bearer context according to a second plurality of QoS parameters associated to the EPS bearer context. The LTE network may transmit the request message to the NR network.

In one example, the NR network may generate the handover command message in response to the request message. Thus, the NR network configures a radio bearer (RB) to the UE according to the EPS bearer context or schedules a data transmission to the UE according to the EPS bearer context. In one example, the UE and the NR network communicate (e.g., transmit or receive) data via the RB with each other. In one example, the handover command configures radio resources to the UE.

In one example, in response to the handover command message received from the LTE system, the UE performs a handover to the NR network. When the UE successfully connects to the NR network, the UE transmits a handover complete message to the LTE network. In response to the handover complete message, the NR network transmits a notification message to the LTE network. Thus, the LTE network knows that the UE has successfully completed the handover to the NR network, and releases the context of the UE or the UE access stratum context of the UE when receiving the notification message.

The following examples may be applied to the processes 30 and 40.

In one example, the context of the UE may comprise a flow ID and a first plurality of QoS parameters for a QoS flow. In one example, the LTE network generates (e.g., derives, converts to or maps to) the first plurality of QoS parameters in the EPS bearer context according to a second plurality of QoS parameters associated to (or in) the EPS bearer context. The LTE network may determine the flow ID according to the EPS bearer ID. In one example, the LTE network may set the flow ID to the EPS bearer ID, or derive the flow ID from the EPS bearer ID. The context of UE may comprise a QoS flow context.

In one example, the context of the UE may comprise an EPS bearer context. The LTE network may transmit the EPS bearer context to the NR network and the NR network may convert a QoS flow context for a QoS flow from the EPS bearer context. In one example, the NR network may determine a flow ID of the QoS flow from the EPS bearer ID. In one example, the NR network may set the flow ID to the EPS bearer ID, or derive the flow ID from the EPS bearer ID. In one example, the NR network generates (e.g., derives, converts to or maps to) a first plurality of QoS parameters for the QoS flow according to a second plurality of QoS parameters associated to (or in) the EPS bearer context. The QoS flow context may include the flow ID and the first plurality of QoS parameters.

In one example, the radio resources include a physical layer configuration, a medium access control (MAC) layer configuration and a RB configuration. In one example, the RB configuration includes at least one of a radio link control (RLC) configuration, a logical channel identity and a logical channel priority. The RB configuration may include a RB identity associated to the flow ID. In one example, the UE and the NR network communicate (e.g., transmit or receive) data of the flow ID via a RB configured by the RB configuration.

The context response message or the request message may include a temporary UE identity and a security configuration (e.g., a security key, a security algorithm, etc.).

Figure 5:
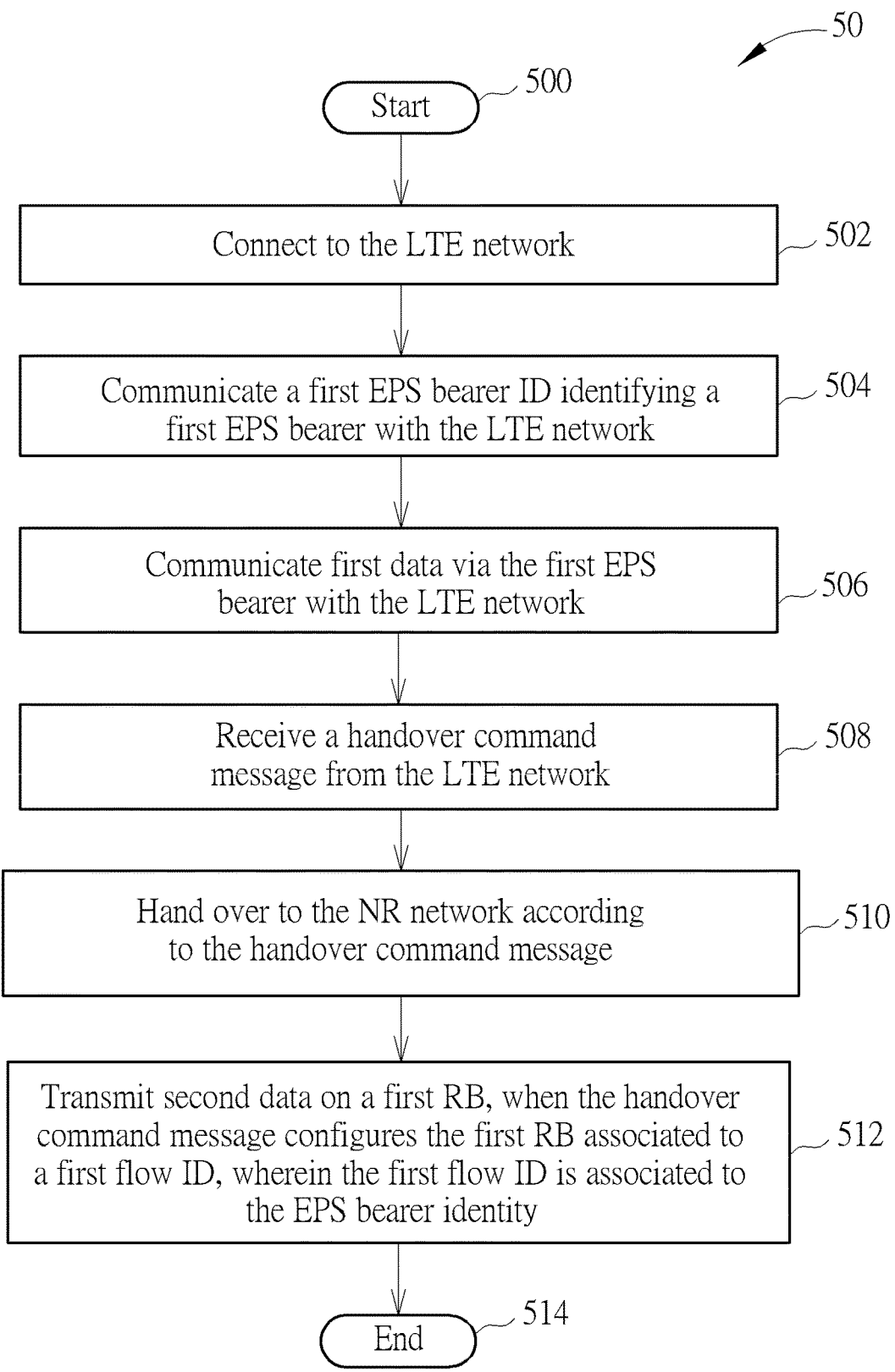
FIG. 5 is a flowchart of a process according to an example of the present invention.

FIG. 5 is a flowchart of a process 50 according to an example of the present invention. The process 50 can be utilized in a UE, for handling for a UE mobility from a LTE network to a NR network. The process 50 includes the following steps:

Step 500: Start.
Step 502: Connect to the LTE network.
Step 504: Communicate a first EPS bearer ID identifying a first EPS bearer with the LTE network.
Step 506: Communicate first data via the first EPS bearer with the LTE network.
Step 508: Receive a handover command message from the LTE network.
Step 510: Hand over to the NR network according to the handover command message.
Step 512: Transmit second data on a first RB, when the handover command message configures the first RB associated to a first flow ID, wherein the first flow ID is associated to the EPS bearer identity.
Step 514: End.

The following examples may be applied to the process 50.

In one example, the second data may belong to a first data flow. In one example, the first data flow includes an internet protocol (IP) flow or a QoS flow. In one example, the first data flow includes a plurality of IP packets with the same source IP address or destination IP address as that of the IP flow. The first data flow may be identified by the first flow ID.

In one example, the handover command message configures the UE to hand over to a cell of the NR network. The UE connects to the cell (e.g., controlled by a second BS) of the NR network according to the handover command message. In one example, the handover command message comprises a first RB configuration configuring the first RB, and comprises the first flow ID which is the same as the first EPS bearer ID. In one example, the NR network also transmits data of the first data flow on the first RB to the UE. In one example, the first flow ID is mapped to (or derived from) the first EPS bearer ID as described above, and is not narrated herein. That is, when the UE determines that the first flow ID is mapped to the first EPS bearer ID, the UE transmits the second data of the first data flow on the first RB.

In one example, the first data is associated to the first EPS bearer. In one example, the first data may belong to the first data flow.

In one example, the handover command message configures a second RB not associated to the first flow ID. In one example, the second RB is a signaling RB. In one example, the handover command message configures a third RB associated to a second flow ID which is set to a second EPS bearer identity identifying a second EPS bearer. The second flow ID identifies a second data flow. In this case, the UE may transmit data of the second data flow on the third RB to the NR network. The NR network may transmit data of the second data flow on the third RB to the UE. The second data flow includes a QoS flow, an IP flow or a non-IP flow. In one example, the second data flow has a different source or a different destination IP address from that of the first data flow. In one example, the second data flow may have the same source or the same destination IP addresses with the first data flow but may have a different source or a different destination port number from the first data flow.

Figure 6:
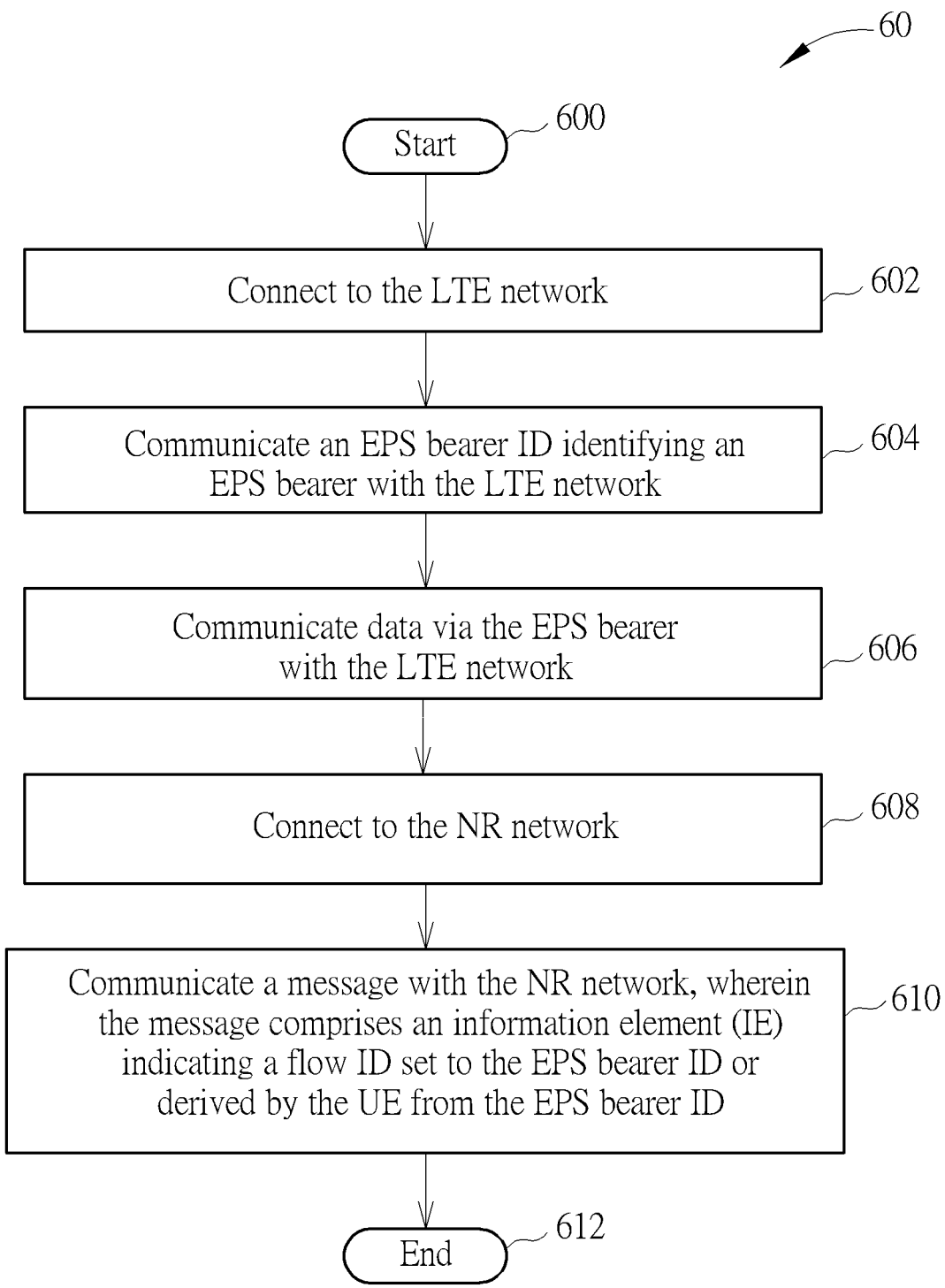
FIG. 6 is a flowchart of a process according to an example of the present invention.

FIG. 6 is a flowchart of a process 60 according to an example of the present invention. The process 60 can be utilized in a UE, for handling mobility for a UE from a LTE network to a NR network. The process 60 includes the following steps:

Step 600: Start.
Step 602: Connect to the LTE network.
Step 604: Communicate an EPS bearer ID identifying an EPS bearer with the LTE network.
Step 606: Communicate data via the EPS bearer with the LTE network.
Step 608: Connect to the NR network.
Step 610: Communicate a message with the NR network, wherein the message comprises an information element (IE) indicating a flow ID set to the EPS bearer ID or derived by the UE from the EPS bearer ID.
Step 612: End.

The following examples may be applied to the process 60.

In one example, the UE derives (e.g., determines, maps to, generates or converts to) the flow ID from the EPS bearer ID by a math operation. For example, the flow ID equals to the EPS bearer ID minus N, wherein N is a fixed value. For example, the flow ID equals to the EPS bearer identity plus N, wherein N is a fixed value. N may be configured by the NR network, or may be predetermined (e.g., described) in a standard specification.

In one example, the IE includes the EPS bearer ID. In one example, the IE includes a bit and a position of the bit indicating the flow ID.

In one example, the UE connects to a first BS of the LTE network. The UE communicates (e.g., transmits or receives) data of (or associated to) the EPS bearer with the first BS of the LTE network. Then, the UE connects to the NR network due to a handover or a cell selection (or reselection) to a cell of the NR network. In case of the handover, the UE receives a handover command message (e.g., RRCConnectionReconfiguration) from the first BS. The UE communicates (e.g., transmits or receives) a Non-Access Stratum (NAS) message with the NR network, wherein the NAS message includes an IE indicating the flow ID. In one example, the UE may set the flow ID determined from the EPS bearer identity.

In one example, the message may be a NAS message or a radio resource control (RRC) message.

In one example, the NAS message is a MM message. In one example, the MM message is a service request message or a message updating a tracking area (e.g., tracking area update request message or registration request message). In one example, the IE indicates status of a data flow in the MM message. When the NR network receives the IE, the NR network maintains (e.g., keeps) a context of the data flow identified by the flow ID for the UE. The NR network receives the EPS bearer context, and generates (e.g., derives, converts to or maps to) the context of the data flow from the EPS bearer context.

In one example, the NAS message is an NR session management (SM) message. The NR SM message may be an activate dedicated EPS bearer context request message, a bearer resource allocation request message, a bearer resource modification request message, a deactivated EPS bearer context request message, a deactivate EPS bearer context accept message, a modify EPS bearer context request message, a modify EPS bearer context reject message, a modify EPS bearer context accept message, a deactivate protocol data unit (PDU) session request message, a SM information request message or a SM information response message. When the UE or the NR network receives the flow ID in the SM message, the UE or the NR network may operate the EPS bearer context identified by the flow ID according to a purpose of the SM message. In one example, the UE transmits the bearer resource modification request message including the flow ID to the NR network to request a release of the EPS bearer context. The LTE network may transmit the deactivate EPS bearer context request message including the flow ID in response to the bearer resource modification request message.

Figure 7:
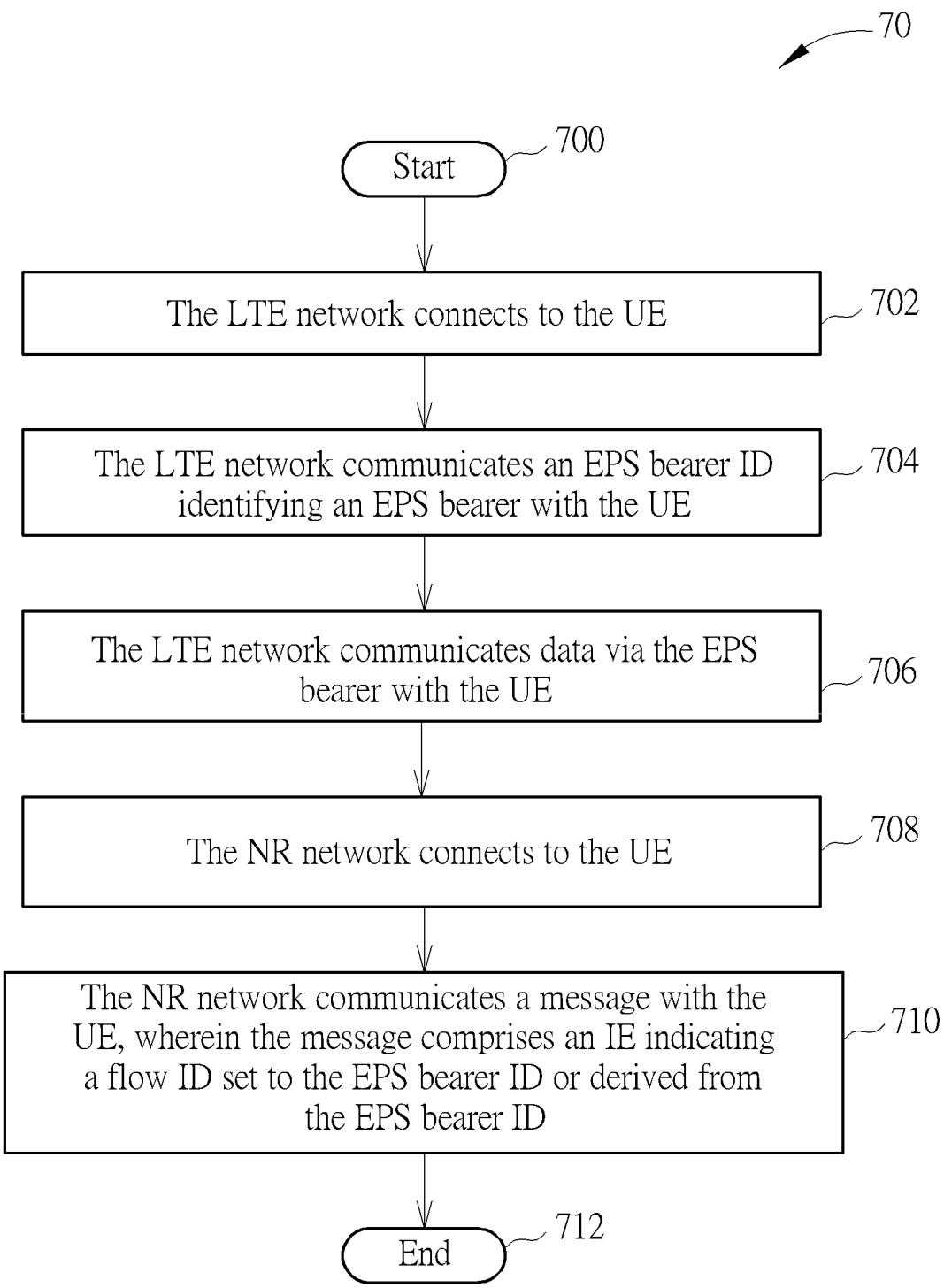
FIG. 7 is a flowchart of a process according to an example of the present invention.

FIG. 7 is a flowchart of a process 70 according to an example of the present invention. The process 70 can be utilized in a network including a LTE network and a NR network, for handling mobility for a UE from the LTE network to the NR network. The process 70 includes the following steps:

Step 700: Start.
Step 702: The LTE network connects to the UE.
Step 704: The LTE network communicates an EPS bearer ID identifying an EPS bearer with the UE.
Step 706: The LTE network communicates data via the EPS bearer with the UE.
Step 708: The NR network connects to the UE.
Step 710: The NR network communicates a message with the UE, wherein the message comprises an IE indicating a flow ID set to the EPS bearer ID or derived from the EPS bearer ID.
Step 712: End.

Operations in the process 70 may correspond to operations in the process 60. The description for the process 60 may be applied to the process 70, and is not narrated herein.

In one example, the NR network may set the flow ID to the EPS bearer ID, or derive the flow ID from the EPS bearer ID as the UE described in the process 60. In one example, the NR network may receive the EPS bearer ID from the LTE network. In one example, the NR network may receive the flow ID from the LTE network. The LTE network may set the flow ID to the EPS bearer ID, or derive the flow ID from the EPS bearer ID as the UE described in the process 60.

Figure 8:
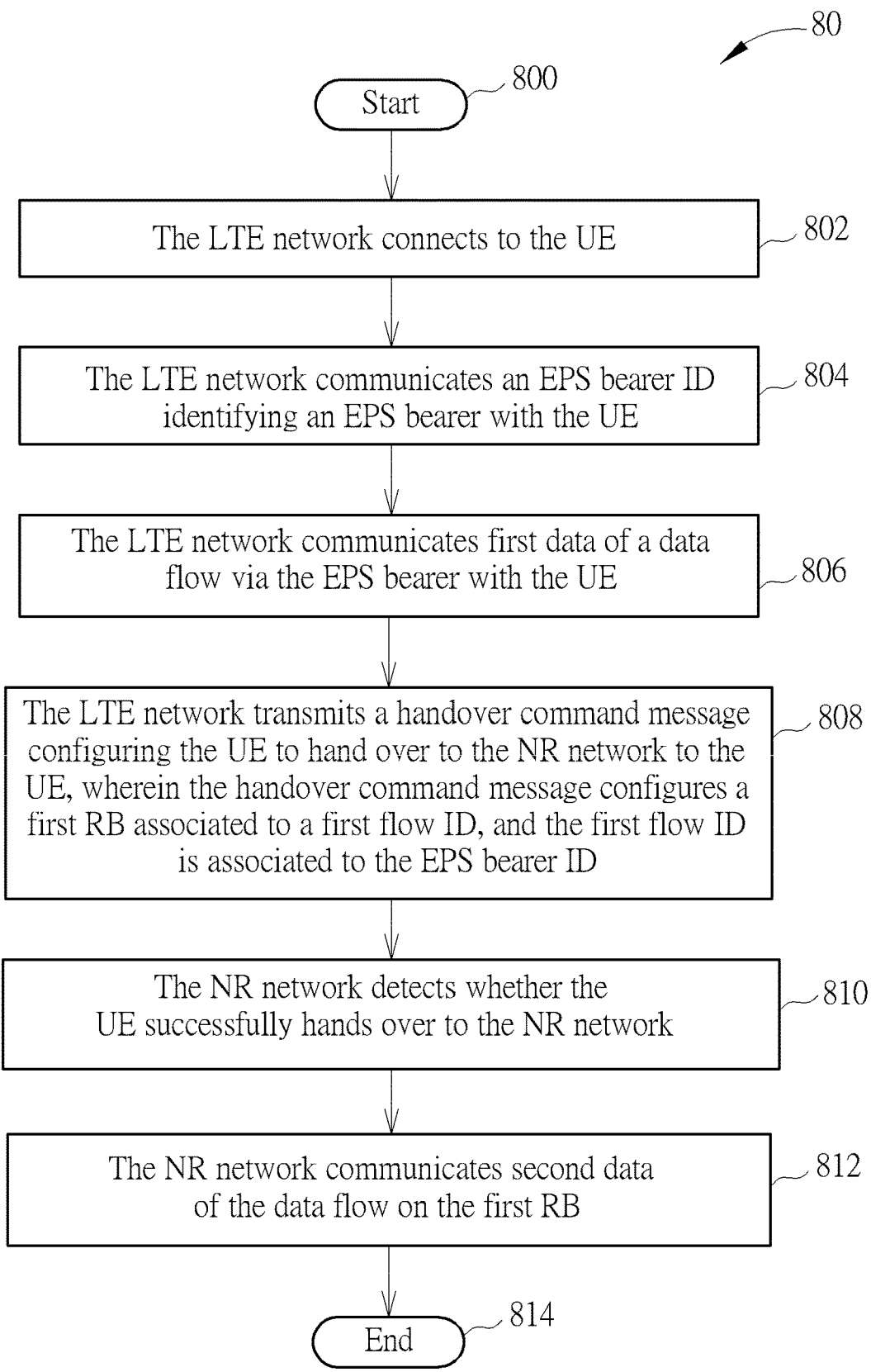
FIG. 8 is a flowchart of a process according to an example of the present invention.

FIG. 8 is a flowchart of a process 80 according to an example of the present invention. The process 80 can be utilized in a network (including a LTE network and a NR network), for handling mobility for a UE from the LTE network to the NR network. The process 70 includes the following steps:

Step 800: Start.
Step 802: The LTE network connects to the UE.
Step 804: The LTE network communicates an EPS bearer ID identifying an EPS bearer with the UE.
Step 806: The LTE network communicates first data of a data flow via the EPS bearer with the UE.
Step 808: The LTE network transmits a handover command message configuring the UE to hand over to the NR network to the UE, wherein the handover command message configures a first RB associated to a first flow ID, and the first flow ID is associated to the EPS bearer ID.
Step 810: The NR network detects whether the UE successfully hands over to the NR network.
Step 812: The NR network communicates second data of the data flow on the first RB.
Step 814: End.

The following examples may be applied to the process 80.

In one example, the flow ID may be set to the EPS bearer ID or derived from the EPS bearer ID as described in the processes above.

Operations in the process 80 may correspond to operations in the process 50. The description for the process 50 may be applied to the process 80, and is not narrated herein.

Realization of the processes 30-80 is not limited to the above description. The following examples may be applied to the processes 30-80.

In one example, "communicate" comprises "transmit" or "receive". In one example, when the UE connects to the NR network, the NR network transmits a NR RRC message configuring the flow ID and a RB configuration, to the UE. The RB configuration may configure a RB. The UE may communicate (e.g., transmits or receives) the data of the EPS bearer on the RB.

In one example, the handover command message may be a RRC message (e.g. RRC Reconfiguration message) and the handover complete message may be a RRC message (e.g. RRC Reconfiguration Complete message).

In one example, the EPS bearer may comprise, map to or associate to a QoS flow, a PDU flow, an IP flow or a non-IP flow. An association between the flow ID and the EPS bearer identity may be predetermined (e.g., described in a standard specification). In one example, the EPS bearer context comprises the EPS bearer identity identifying the EPS bearer, an IP address or a plurality of QoS parameters.

In one example, the UE transmits the flow ID in a NR SM message to the NR network. In one example, the UE includes the flow ID in a activate PDU session request message. In one example, the NR network includes a flow ID in a first RRC Reconfiguration message transmitted to the UE. Thus, the UE knows that the NR network configures the radio resources for communicating the data of the EPS bearer according to the flow ID, when the UE receives the first RRC Reconfiguration message. The NR network may include the flow ID in the NG2 request message. The radio resources may include a RB configuration, a physical layer configuration or a MAC layer configuration. The RB configuration may include at least one of a RLC configuration, a logical channel identity and a logical channel priority.

In one example, the UE includes a PDU session ID in the Activate PDU Session Request message to establish a PDU session. The NR network may include the PDU session ID in the activate PDU session accept message in response to the Activate PDU session request message. The EPS bearer may be associated to the PDU session.

In one example, after establishing the PDU session, the UE requests to setup an EPS bearer to transmit the data of the EPS bearer by transmitting a first NR SM message to the NR network. The first NR SM message may include a flow ID for identifying the EPS bearer. In one example, the first NR SM message is an EPS Bearer Resource Allocation Request message. The NR network transmits a second NR SM message (e.g., an Activate EPS Bearer Request message) to the UE in response to the NR SM message. The second NR SM message may include the other flow ID. The NR network may include the other flow ID in a second RRC Reconfiguration message transmitted to the UE. Thus, the UE knows that the NR network configures the radio resources for communicating data of the other EPS bearer when the UE receives the second RRCReconfiguration message.

In one example, the data of the EPS bearer includes a plurality of IP packets associated to the EPS bearer. In one example, the data of the EPS bearer includes a plurality of PDUs and each PDU of the plurality of PDUs includes a packet of the EPS bearer. Each PDU of the plurality of PDUs may include the EPS bearer identity. In one example, the PDU is a Packet Data convergence Protocol (PDCP) PDU.

In one example, the UE and the NR network generate (e.g., determine, derive, map to or convert to) the EPS bearer identity from the PDU session and the flow ID.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling mobility for a UE from the LTE radio network to the NR network. The seamless service continuity for the UE can be provided. Thus, the problem of the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A long-term evolution (LTE) network for handling mobility for a communication device from the LTE network to a new ratio (NR) network, comprising:
a storage device; and
a processing circuit, coupled to the storage device, wherein the storage device stores, and the processing circuit is configured to execute instructions of:
connecting to the communication device;
communicating an evolved packet system (EPS) bearer identity (ID) identifying an EPS bearer with the communication device;
communicating data via the EPS bearer with the communication device;
receiving a context request message for the communication device from the NR network; and
transmitting a context response message comprising a context of the communication device to the NR network.

2. The LTE network of claim 1, wherein the context comprises a flow ID and a first plurality of quality-of-service (QoS) parameters and the instructions further comprise:
determining the flow ID according to the EPS bearer ID; and
generating the first plurality of QoS parameters in the EPS bearer context according to a second plurality of QoS parameters in the EPS bearer context.

3. The LTE network of claim 1, wherein the context comprises an EPS bearer context, and the NR network converts a QoS flow context for a QoS flow from the EPS bearer context.

4. The LTE network of claim 1, wherein the context comprises an EPS bearer context, and the NR network determines a flow ID of a QoS flow from the EPS bearer ID.

5. The LTE network of claim 1, wherein the context comprises an EPS bearer context, and the NR network converts a first plurality of QoS parameters for the QoS flow to a second plurality of QoS parameters in the EPS bearer context.

6. A long-term evolution (LTE) network for handling mobility for a communication device from the LTE network to a new ratio (NR) network, comprising:
a storage device; and
a processing circuit, coupled to the storage device, wherein the storage device stores, and the processing circuit is configured to execute instructions of:
connecting to the communication device;
communicating an evolved packet system (EPS) bearer identity (ID) identifying an EPS bearer with the communication device;
communicating data via the EPS bearer with the communication device;
transmitting a request message comprising a context of the communication device to the NR network for initiating a handover for the communication device to the NR network;
receiving a response message from the NR network, wherein the response message comprises a handover command message for handing over the communication device to the NR network; and
transmitting the handover command message to the communication device.

7. The NR network of claim 6, wherein the request message is a handover request message, and the response message is a handover request acknowledge message.

8. The NR network of claim 6, wherein the context comprises a flow ID and a first plurality of quality-of-service (QoS) parameters and the instructions further comprise:
determining the flow ID according to the EPS bearer ID; and
generating the first plurality of QoS parameters in the EPS bearer context according to a second plurality of QoS parameters in the EPS bearer context.

9. The LTE network of claim 6, wherein the context comprises an EPS bearer context, and the NR network converts a QoS flow context for a QoS flow from the EPS bearer context.

10. The LTE network of claim 6, wherein the context comprises an EPS bearer context, and the NR network determines a flow ID of a QoS flow from the EPS bearer ID.

11. The LTE network of claim 6, wherein the context comprises an EPS bearer context, and the NR network converts a first plurality of QoS parameters for the QoS flow to a second plurality of QoS parameters in the EPS bearer context.

12. A communication device for handling mobility from a long-term evolution (LTE) network to a new radio (NR) network, comprising:
a storage device; and
a processing circuit, coupled to the storage device, wherein the storage device stores, and the processing circuit is configured to execute instructions of:

connecting to the LTE network;

communicating a first evolved packet system (EPS) bearer identity (ID) identifying a first EPS bearer with the LTE network;

communicating first data via the first EPS bearer with the LTE network;

receiving a handover command message from the LTE network;

handing over to the NR network according to the handover command message; and transmitting second data on a first radio bearer (RB), when the handover command message configures the first RB associated to a first flow ID;

wherein the first flow ID is associated to the EPS bearer identity.

13. The communication device of claim 12, wherein the handover command message comprises a first RB configuration configuring the first RB, and comprises the first flow ID associated to the first EPS bearer identity.

14. The communication device of claim 12, wherein the handover command message configures a second RB not associated to the first flow ID.

15. The communication device of claim 12, wherein the handover command message configures a third RB associated to a second flow ID which is set to a second EPS bearer identity identifying a second EPS bearer.

* * * * *